United States Patent
Wheeler et al.

(10) Patent No.: US 6,606,098 B1
(45) Date of Patent: Aug. 12, 2003

(54) METHOD AND APPARATUS HAVING AN EXTENDED VIDEO GRAPHICS BUS

(75) Inventors: Peter Wheeler, Mississauga (CA); Vijay Sharma, Oakville (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/272,461

(22) Filed: Mar. 19, 1999

(51) Int. Cl.⁷ .............................................. G06F 13/14
(52) U.S. Cl. ..................... 345/520; 345/503; 345/600; 710/300; 710/305
(58) Field of Search ................................ 345/501–503, 345/520–521, 2, 213, 531, 600; 340/711; 370/474; 709/231; 710/1, 65, 69–71, 101, 106, 129, 100, 300, 305–307

(56) References Cited

U.S. PATENT DOCUMENTS

| | | | | |
|---|---|---|---|---|
| 4,143,360 A | * | 3/1979 | Bernhart et al. ............ | 340/711 |
| 5,604,509 A | * | 2/1997 | Moore et al. .................. | 345/2 |
| 5,606,348 A | * | 2/1997 | Chiu ........................... | 345/213 |
| 5,914,727 A | * | 6/1999 | Horan et al. ................ | 345/503 |
| 5,974,464 A | * | 10/1999 | Shin et al. .................. | 709/231 |
| 6,085,257 A | * | 7/2000 | Ducaroir et al. ............. | 710/1 |
| 6,233,253 B1 | * | 5/2001 | Settle et al. ................ | 370/474 |
| 6,252,612 B1 | * | 6/2001 | Jeddeloh ..................... | 345/521 |
| 6,307,543 B1 | * | 10/2001 | Martin ........................ | 345/213 |
| 6,345,330 B2 | * | 2/2002 | Chu ............................ | 710/29 |

OTHER PUBLICATIONS

Plug and Display Standard, Video Electronics Standards Association (VESA), Version 1, Jun. 11, 1997, Milpitas, CA, pp. 13–47.*

* cited by examiner

Primary Examiner—Ulka J. Chauhan
(74) Attorney, Agent, or Firm—Vedder, Price, Kaufman & Kammholz

(57) ABSTRACT

A method and apparatus that extends the video graphics bus from the computer unit to a monitor is used within a computer system that includes a computer unit and a monitor. The computer unit includes a central processing unit, system memory, an accelerated graphics port chip set, and a first AGP coupling converter. The first AGP coupling converter is operably coupled to the AGP chip set and receives video graphics data (e.g., vertex data for triangles corresponding to three-dimensional graphics) and converts the transport formatting of the video graphics. Such transport formatting conversion may include changing from a parallel transport to a serial transport or from a parallel transport to a reduced parallel transport. The monitor includes a second AGP coupling converter, a video graphics controller, and a display device. The second AGP coupling converter is operably coupled, via a cable, to the first AGP coupling converter. The second AGP coupling converter is operable to receive the converted transport format data and to recapture the video graphics data. The recaptured video graphics data is then provided to the video graphics controller, which produces display data therefrom. The display data is then provided to the display device for displaying.

19 Claims, 3 Drawing Sheets

METHOD AND APPARATUS HAVING AN EXTENDED VIDEO GRAPHICS BUS

TECHNICAL FIELD OF THE INVENTION

This invention relates generally to computer systems and more particularly to video graphics processing.

BACKGROUND OF THE INVENTION

Computers are known to include a central processing unit, system memory, audio processing circuitry, video graphics processing circuitry, and peripheral ports. The peripheral ports allow the central processing unit to transport data with peripheral devices such as monitors, external memory, printers, the Internet, keyboards, mouse, etc. In many computer architectures, an accelerated graphics port (AGP) chip set is included. The AGP chip set provides an interface between the central processing unit system memory, graphics circuitry, and peripheral ports. As such, the AGP chip set coordinates transport of data between such devices.

As the complexity of video graphics displays increases and as the size of displays increase, the amount of data transported from the video graphics circuit to a display is increasing. Currently, such display data is transported from the video graphics circuitry to the display in accordance with the digital flat panel (DFP) standard, which designates a 32-byte parallel signal for transporting the display data. However, with the increase in graphics complexity and display size, the DFP standards may be inadequate to support such data transports.

For example, if the display is a plasma display, which requires frame sequential color (FSC), the R component, G component, and B component are sent separately, thus requiring three times the typical 60 Hz refresh rate. In addition, the FSC bandwidth for the same display will be higher (e.g., 1.463 gigabytes per second in comparison to 1.064 gigabytes per second for a 1680-by-1210 UXGA display).

As is also known, the video graphics circuit for three-dimensional graphics receives vertex information of triangles of images via the AGP bus or the PCI bus. Upon receiving the vertex information, the video graphics circuit processes it to produce the display data. Accordingly, the amount of data the video graphic circuit receives via the AGP bus, or the PCI bus, is considerably less than the data transported by the video graphic circuit to the display. Thus, as the amount of display data increases due to the larger displays, displays using FSC, and/or more complex video graphics, a data bottleneck arises in transporting the display data from the video graphics circuit to the display.

Therefore, a need exists for a method and apparatus that extends the video graphics bus to the display, thereby reducing the data bottleneck to the display.

DETAILED DESCRIPTION OF THE PREFERRED EMBODIMENT

Generally, the present invention provides a method and apparatus that extends the video graphics bus from the computer unit to a monitor. In such a system, the computer unit includes a central processing unit, system memory, an accelerated graphics port chip set, and a first AGP coupling converter. The first AGP coupling converter is operably coupled to the AGP chip set and receives video graphics data (e.g., vertex data for triangles corresponding to three-dimensional graphics) and converts the transport formatting of the video graphics. Such transport formatting conversion may include changing from a parallel transport to a serial transport or from a parallel transport to a reduced parallel transport. For example. For a reduced parallel transport, the original data may be transported using a 32 bit parallel connection, while the reduced parallel transport may be a 2, 4, 8, or 16 bit parallel connection. The computer system also includes a monitor that in no includes a second AGP coupling converter, a video graphics controller, and a display device. The second AGP coupling converter is operably coupled, via a cable, to the first AGP coupling converter. The second AGP coupling converter is operable to receive the converted transport format data and to recapture the video graphics data. The recaptured video graphics data is then provided to the video graphics controller, which produces display data therefrom. The display data is then provided to the display device for displaying. With such a method and apparatus the video graphics bus is extended from the computing unit to the monitor such that significantly less data is transported over the cable coupling the computing unit to the display.

Figure 1:
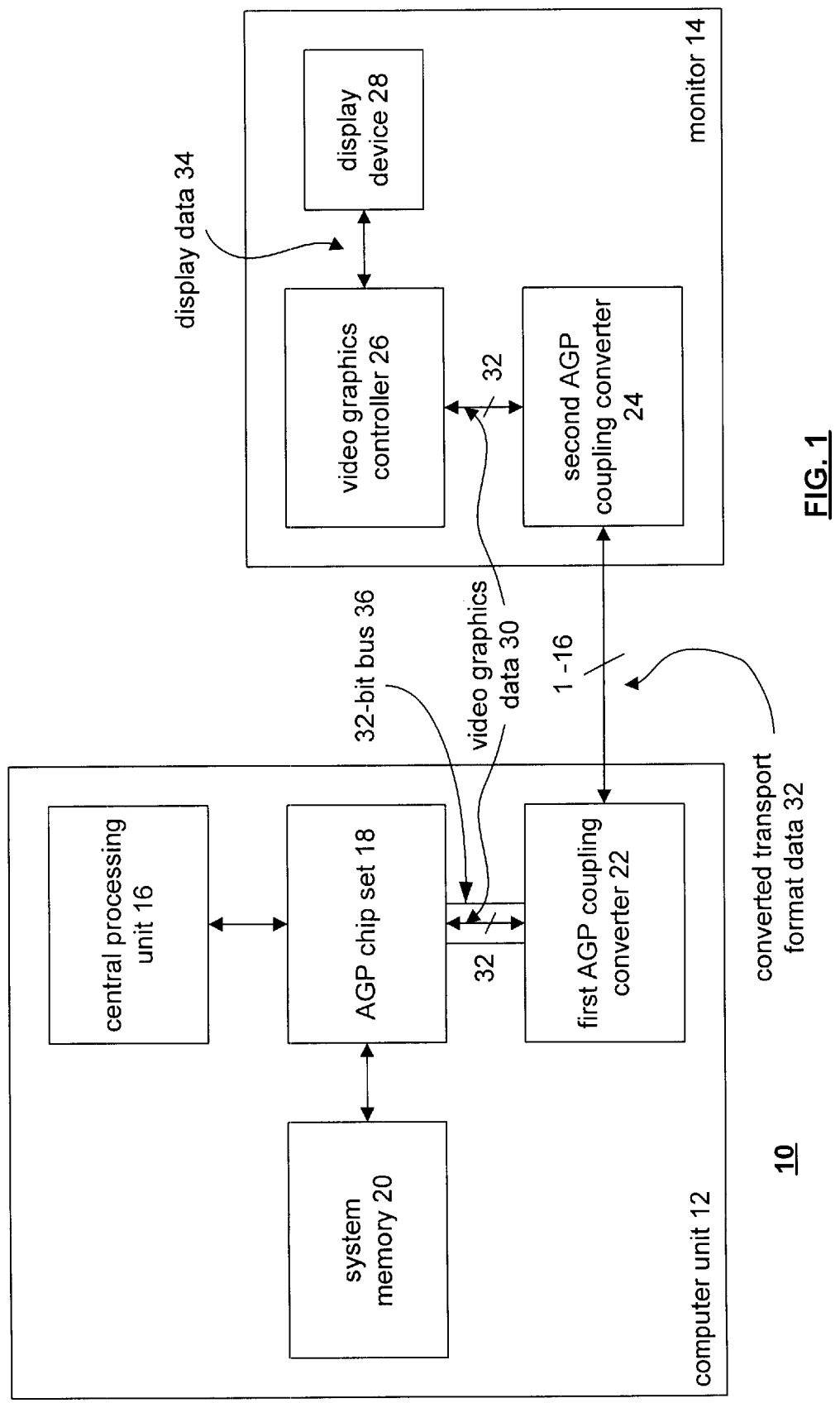
FIG. 1 illustrates a schematic block diagram of a computer in accordance with the present invention.

The present invention can be more fully described with reference to FIGS. 1–4. FIG. 1 illustrates a schematic block diagram of a computing system 10 that includes a computing unit 12 and monitor 14. the computing unit 12 includes a central processing unit 16, an AGP chip set 18, system memory 20, and a first AGP coupling converter 22, the central processing unit 16, the AGP chip set 18, and the system memory 20 may be of similar components found in personal computers, workstations, or other types of computing devices. The AGP chip set 18 is operably coupled to, as shown, the first AGP coupling converter via a 32-bit parallel bus 36. The 32-bit bus 36 may be an AGP bus, and/or a PCI bus. Note that the bus 36 may be of a lesser or greater bit size than 32 bits.

The first AGP coupling converter 22 receives video graphics data 30 via the 32-bit bus 36 from the AGP chip set 18. Note that the first AGP coupling converter may be configured as a printed circuit board t couples into the existing AGP card slot within a personal computer. As such, in one embodiment, the video graphics card is removed from the AGP card slot within the computing unit and replaced with the first AGP coupling converter. As an alternative embodiment, the first AGP coupling converter may be included on the motherboard within the computing unit 12.

Upon receiving the video graphics data 30, the first AGP coupling converter 22 converts the transport formatting of the video graphics data 30 into converter transport format data. Such transport conversion may be done by converting the video graphics data from parallel digital video graphics data into serial digital video graphics data, by converting the video graphics data from parallel digital video graphics data into serial analog video graphics data, or by converting the video graphics data from parallel video graphics data into reduced parallel video graphics data. Note that the video graphics data includes graphics data generated by the central processing unit, video data received via a video input or from the central processing unit, texture mapping data, alpha blending data, and/or any other data used by a video graphics circuit to produce an image.

The first AGP coupling converter 22 includes a parallel-to-serial convener to convert the parallel digital video graphics data into serial digital video graphics data Such a parallel-to-serial converter may include a shift register for storing a 32-bit word which is serially transported to a gating circuit which drives a differential driver. The differential driver drives the cable, which is used to couple the computer unit 12 to the monitor 14. Note that the cable coupling As computing unit 12 to the monitor 14 may be a copper cable, fiber optics cable, and/or any other type of cable for transporting high data rate signals.

The first AGP coupling converter includes a digital-to-analog converter to convert the parallel digital video graphics data into serial analog video graphics data. Such a digital-to-analog converter produces the serial analog video graphics data that is transported via the cable coupling the computer unit 12 to the monitor 14.

The monitor 14 includes a second AGP coupling converter 24, a video graphics controller 26, and a display device 28. The second AGP coupling converter 24 is operably coupled to receive converted transport format data 32 from the first AGP coupling converter 22 via the cable. The second AGP coupling converter 24 includes complementary circuitry to the first AGP coupling converter 22. For example, if the converted transport format data 32 is serial digital video graphics data, the second AGP coupling converter includes a serial-to-parallel converter to recapture the parallel digital video graphics data. Alternatively, if the converted transport format data 32 is serial analog video graphics data, the second AGP coupling converter 24 includes an analog-to-digital converter to recapture the parallel digital video graphics data. As yet another alternative, when the converted transport format data 32 is reduced parallel video graphics data, the second AGP coupling converter 24 includes circuitry to recapture the video graphics data.

The Second AGP coupling converter 24 provides the recaptured video graphics data 30 to the video graphics controller 26 via a parallel bus, which may be a 32-bit bus. The video graphics controller 26 produces display data 34 from the video graphics data 30. The video graphics controller 26 may be of the type found in the All-in-Wonder board, and derivatives thereof, produced and manufactured by ATI International. The display device 28 may be a LCD panel, a CRT monitor, a plasma display, a high definition television, a television set, etc.

As shown in FIG. 1, the AGP bus is extended from the computer unit 12 to the monitor 14. By extending the bus in this manner, the amount of data transported via the cable coupling these units together is substantially reduced. As is generally known, the amount of video graphics data 30 is less than the amount of display data 34. Such an extension becomes increasingly beneficial as the complexity of video graphics displays increases and/or as the size of displays increase.

Figure 2:
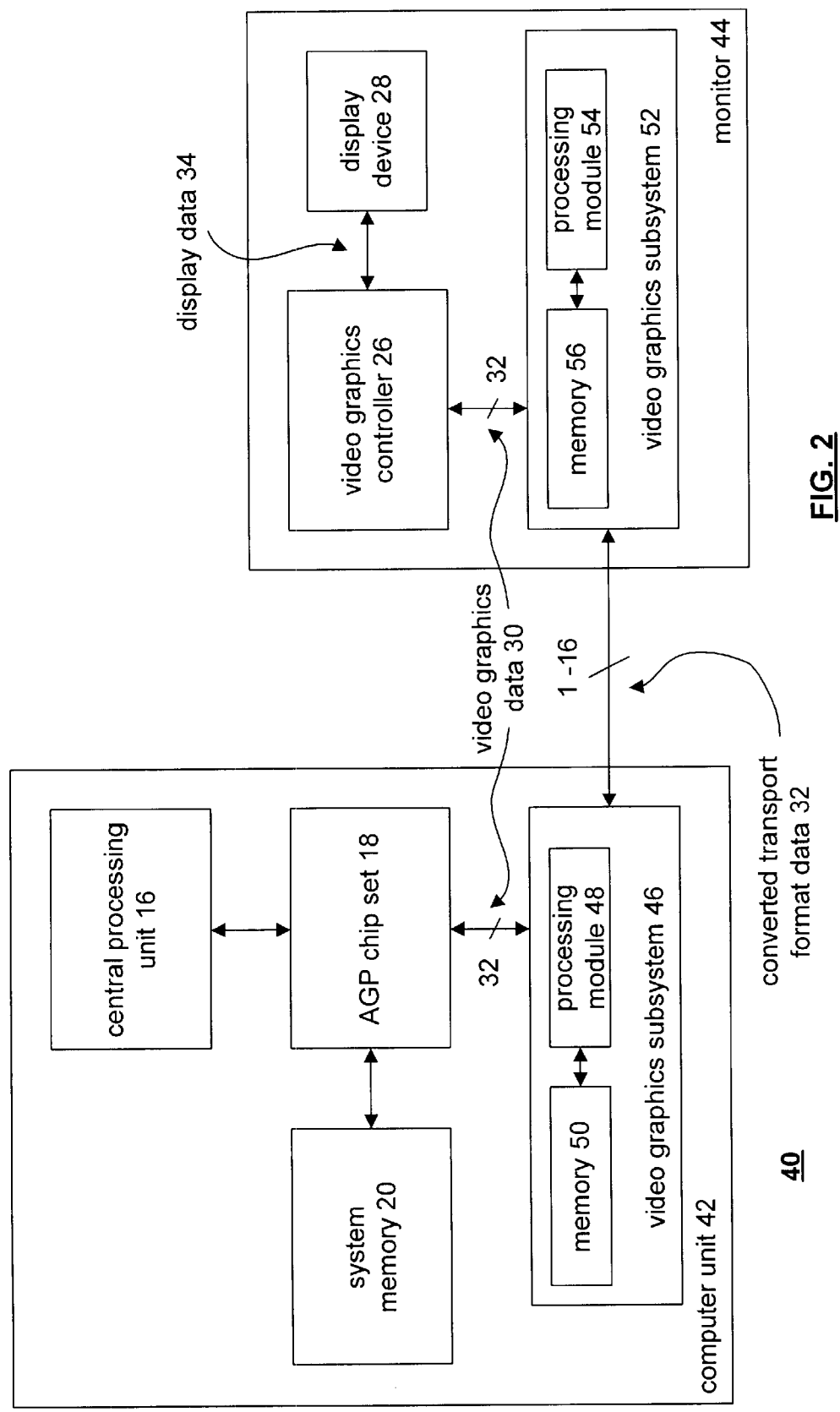
FIG. 2 illustrates a schematic block diagram of an alternate computer in accordance with the present invention.

FIG. 2 illustrates a computing system 40 that includes a computer unit 42 and a monitor 44. The computing system 40 is similar to computing system 10 except for the first AGP coupling convener 22 is replaced by a video graphics subsystem 46 and the second AGP coupling converter 24 is replaced by a video graphics subsystem 52. The video graphics subsystem 46 includes a processing module 48 and memory 50. The video graphic subsystem 52 includes a processing module 54 and memory 56. Processing module 48 may be a single processing device or a plurality of processing devices. Such a processing device may be a microprocessor, microcomputer, microcontroller, digital signal processor, state machine, logic circuitry, and part of the central processing unit 16 and/or any device that manipulates data based on operational instructions. Memory 50 may be a single memory device or a plurality of memory devices. Such a memory device may be a read only memory, random access memory, floppy disk, portion of the system memory, and/or any device that stores digital information. Note that when processing module 48 implements one or more of its functions via a slate machine or logic circuitry, the memory that stores the corresponding operational instructions is embedded within the circuitry comprising the state machine and/or logic circuitry. The operational instructions stored in memory 50 and processed by processing module 48 will be discussed in greater detail with reference to FIG. 3.

Processing module 54 may be a single processing device or a plurality of processing devices. Such a processing device may be a microprocessor, microcomputer, microcontroller, a portion of a video graphics controller, processing resources, state machine, logic circuitry, and/or any device that manipulates data based on operational instructions. The memory 56 may be a read-only memory, random access memory, floppy disk memory, portion of the memory contained within the video graphics controller and/or any device tat stores digital information. Note that if the processing module 54 implements one or more of its functions via a state machine or logic circuitry, the memory storing the corresponding operational instructions is embedded within the circuitry comprising the state machine and/or logic circuitry. The operational instructions stored in memory 56 and executed by processing module 54 will be discussed in greater detail with reference to FIG. 4.

Figure 3:
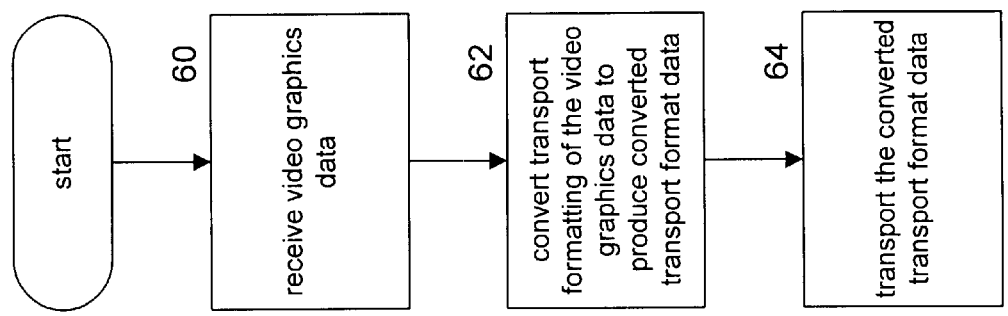
FIG. 3 illustrates a logic diagram of a method for extending the video graphics bus in accordance with the present invention.

FIG. 3 illustrates a logic diagram method for extending a video graphics bus. The process begins at step 60 where video graphics data is received. The process then proceeds to step 62 where the transport formatting of the video graphics data is converted to produce converted transport format data. Such a conversion may be done by converting the video graphics data from parallel digital video graphics data into serial digital video graphics data, by converting the video graphics data from parallel digital video graphics data into serial analog video graphics data, or by converting the video graphics data from parallel video graphics data into reduced parallel video graphics data. Such reduced parallel video graphics data has a lower number of bits per transmission interval than the original parallel video graphics data.

The processing then proceeds to step 64 where the converted transport format data is transported to the monitor. As such, the amount of data transported from the PC to the monitor is reduced since the amount of data contained within the display data is greater than the amount of data within the video graphics data.

Figure 4:
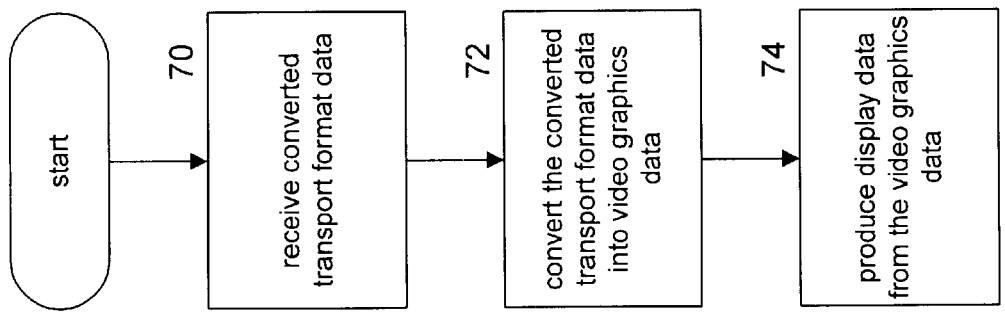
FIG. 4 illustrates a logic diagram of another method for extending the video graphics bus in accordance with the present invention.

FIG. 4 illustrates a logic diagram of a method for extending a video graphics bus. The process begins at step 70 where converted transport format data is received. The process then proceeds to step 72 where the converted transport format data is converted into video graphics data. This may be done by converting the converted transport format data from serial digital video graphics data into parallel digital video graphics, by converting the converted transport format data from serial analog video graphics data into parallel digital video graphics data, or by converting the converted transport data from reduced parallel video graphics data into parallel video graphics data. The process then proceeds to step 74, which is implemented via the video graphics circuitry, to produce display data from the video graphics data.

The preceding discussion has presented a method and apparatus for extending a video graphics bus from the computing unit of a computer system to a monitor. By extending the video graphics bus in this manner, the amount of data transported over the bus can be substantially reduced. By reducing the amount of data, the present invention allows for significantly more video graphics data to be produced and displayed on larger displays than in current implementations.

What is claimed is:

1. A computing system comprises:
    computing unit that includes;
        a central processing unit;
        system memory operably coupled to the processing unit;
        accelerated graphics port (AGP) chip set operably coupled to the central processing unit and the system memory, wherein the AGP chip set provides video graphics data;
        a first AGP coupling converter operably coupled to receive the video graphics data and to convert transport formatting of the video graphics data to produce converted transport format data;
    monitor that includes:
        a second AGP coupling convener operably coupled to receive the converted transport format data and to recapture the video graphics data;
        a video graphics controller operably coupled to receive the video graphics data and to produce therefrom display data; and
        a display device for displaying the display data.

2. The computing system of claim 1, wherein the amount of the display data is greater than the amount of the video graphics data.

3. The computing system of claim 1, wherein the first AGP coupling converter converts the video graphics data from parallel digital video graphics data into serial digital video graphics data and wherein the second AGP coupling converter converts the serial digital video graphics data into the parallel digital video graphics data.

4. The computing system of claim 1, wherein the first AGP coupling converter converts the video graphics data from parallel digital video graphics data into serial analog video graphics data and wherein the second AGP coupling converter converts the serial analog video graphics data into parallel digital video graphics data.

5. The computing system of claim 1, wherein the first AGP coupling converter converts the video graphics data from parallel video graphics data into reduced parallel video graphics data and wherein the second AGP coupling converter converts the reduced parallel video graphics data into the parallel video graphics data.

6. The computing system of claim 1 further comprises a fiber optics cable that couples the first AGP coupling converter to the second AGP coupling converter.

7. The computing system of claim 1 further comprises a PCI bus, wherein the fist AGP coupling converter is coupled to the PCI bus and wherein the AGP coupling converter receives at least a portion of the video graphics data from the PCI bus.

8. A monitor that comprises:
    an AGP coupling converter operably coupled to receive converted sport format data and to recapture video graphics data;
    a video graphics controller operably coupled to receive the video graphics data and to produce therefrom display data; and
    a display device for displaying the display data.

9. The monitor of claim 8, wherein the display device includes at least one of: an LCD flat panel, a CRT, a television, and a high definition television.

10. The monitor of claim 8, wherein the amount of the display data is greater than the amount of the video graphics data.

11. The monitor of claim 8, wherein the AGP coupling converter converts the converted transport format data from serial digital video graphics data into parallel digital video graphics data.

12. The monitor of claim 8, wherein the AGP coupling converter converts the converted transport format data from serial analog video graphics data into parallel digital video graphics data.

13. The monitor of claim 8, wherein the AGP coupling converter converts the converted transport format data from reduced parallel data into parallel digital video graphics data.

14. A video graphics system comprises:
    a first AGP coupling converter operably coupled to receive video graphics data and to convert transport formatting of the video graphics data to produce converted transport format data;
    a second AGP coupling converter operably coupled to receive the converted transport format data and to recapture the video graphics data; and
    a video graphics controller operably coupled to receive the video graphics data and to produce therefrom display data.

15. The video graphics system of claim 14, wherein the amount of the display data is greater than the amount of the video graphics data.

16. The video graphics system of claim 14, wherein the first AGP coupling converter converts the video graphics data from parallel digital video graphics data into serial digital video graphics data and wherein the second AGP coupling converter converts the serial digital video graphics data into the parallel digital video graphics data.

17. The video graphics system of claim 14, wherein the first AGP coupling converter converts the video graphics data from parallel digital video graphics data into serial analog video graphics data and wherein the second AGP coupling converter converts the serial analog video graphics data into parallel digital video graphics data.

18. The video graphics system of claim 14, wherein the first AGP coupling converter converts the video graphics data from parallel video graphics data into reduced parallel video graphics data and wherein the second AGP coupling converter converts the reduced parallel video graphics data into the parallel video graphics data.

19. The video graphics system of claim 14 further comprises a fiber optics cable that couples the first AGP coupling converter to the second AGP coupling converter.

* * * * *